United States Patent [19]

Johnson

[11] 4,148,499
[45] Apr. 10, 1979

[54] HYDRAULIC TRAILER LIFT

[76] Inventor: Herbert J. Johnson, 32 Maverick Park, Lander, Wyo. 82520

[21] Appl. No.: 858,668

[22] Filed: Dec. 8, 1977

[51] Int. Cl.² .............................................. B60D 1/16
[52] U.S. Cl. ............................................... 280/490 R
[58] Field of Search ............................ 280/490 R, 477

[56] References Cited

U.S. PATENT DOCUMENTS

| | | | |
|---|---|---|---|
| 2,846,018 | 8/1958 | Puckett | 280/490 R X |
| 4,000,911 | 1/1977 | Weber | 280/490 R X |

FOREIGN PATENT DOCUMENTS 1963370 6/1971 Fed. Rep. of Germany ...... 280/490 R

*Primary Examiner*—Joseph F. Peters, Jr.
*Assistant Examiner*—R. Schrecengost

[57] ABSTRACT

A hydraulic device for the lifting and lowering of a mobile home or trailer on a towing truck containing a hitching ball is provided. The hitching bar is permanently affixed to a vertical steel casing in which is contained and affixed a hydraulic cylinder. A piston is contained within said cylinder and is affixed to a piston rod which is permanently connected to a plate made integral with the towing vehicle. Hydraulic fluid is injected into the chamber of the cylinder above the piston for raising of the hitching ball and is injected in the bottom chamber of the cylinder for lowering of the hitching ball. The piston and rod do not move. The cylinder and casing and hitching ball move with injection of the hydraulic fluid.

3 Claims, 2 Drawing Figures

HYDRAULIC TRAILER LIFT

BACKGROUND OF THE INVENTION

The invention relates generally to towing devices for trucks and trailers wherein a towing truck or vehicle holds a trailer, mobile home, another vehicle and the like.

The invention relates particularly to a device whereunder the towing vehicle can easily lift and lower the mobile home or trailer onto such towing vehicle.

Towing vehicles for moving mobile homes, trailers, other motor vehicles and the like have become commonplace. Such trucks or towing vehicles employ a hitching ball onto the towing vehicle, such ball being permanently affixed to a structure on the towing vehicle. The mobile home, trailer or towed vehicle contains a socket of other device which is placed onto the hitching ball and forms a joint with such hitching ball for removably affixing the mobile home or towed vehicle or trailer with the truck or towing vehicle. Chains and the like also supplement the above-described joint.

It is convenient to tow the vehicle with the front part of the towed vehicle or mobile home lifted above the ground. For xample, the rear wheels of the towed vehicle are on the ground but the front portion and, in fact, front wheels of the vehicle are off the ground. To accomplish such objectives, this invention describes a novel and convenient hydraulic device for lifting the mobile home or towed trailer on the towing vehicle and, likewise, describes the hydraulic device for lowering the towed vehicle home or vehicle.

Accordingly, one object of the invention is to provide a hydraulic device for lifting a mobile home, trailer or towed vehicle onto a truck or towing vehicle. Another object of the invention is to provide a hydraulic device for lowering of such towed mobile home, trailer or towed vehicle. Other objects of the invention will be apparent from the following description.

DESCRIPTION OF THE DRAWINGS AND DETAILED DESCRIPTION OF THE INVENTION

The invention can be easily ascertained from reference to the accompanying drawing.

Figure 1:
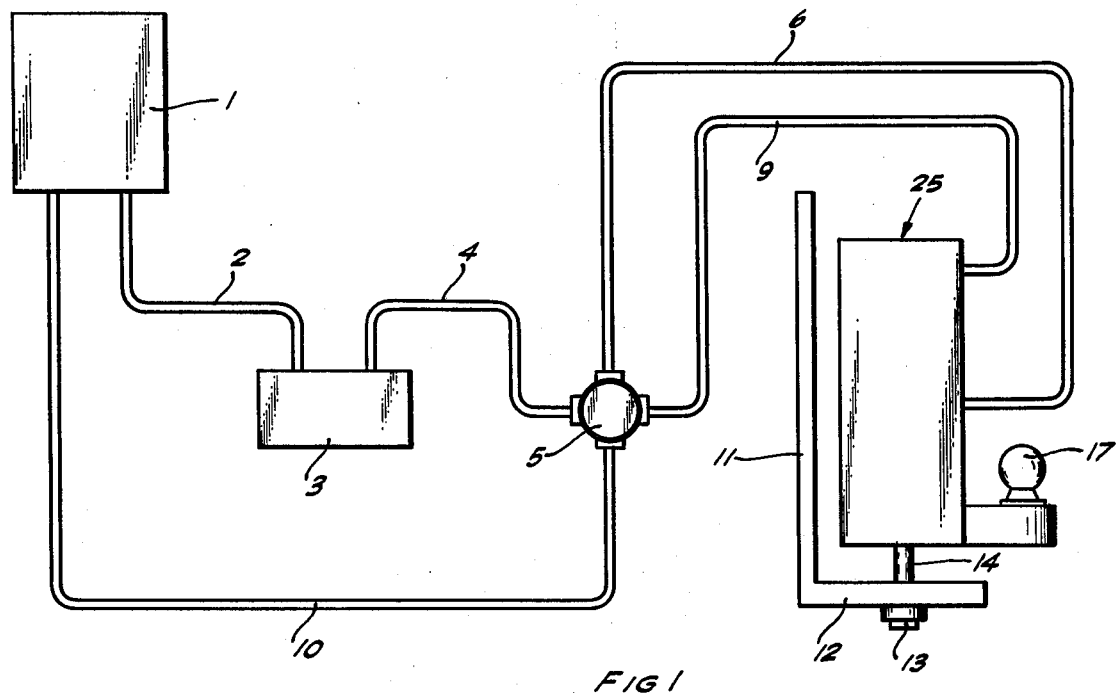
FIG. 1 shows a schematic of the hydraulic system, support members, and hitching ball.

Referring to FIG. 1, there is shown a hydraulic reservoir 1 for storage of hydraulic oil or fluid. The reservoir can be relatively small and can comprise a simple tank or container on the towing vehicle.

Hydraulic pump 3 is shown for pumping of the hydraulic fluid from the reservoir 1 to the hydraulic cylinder to be described.

Figure 2:
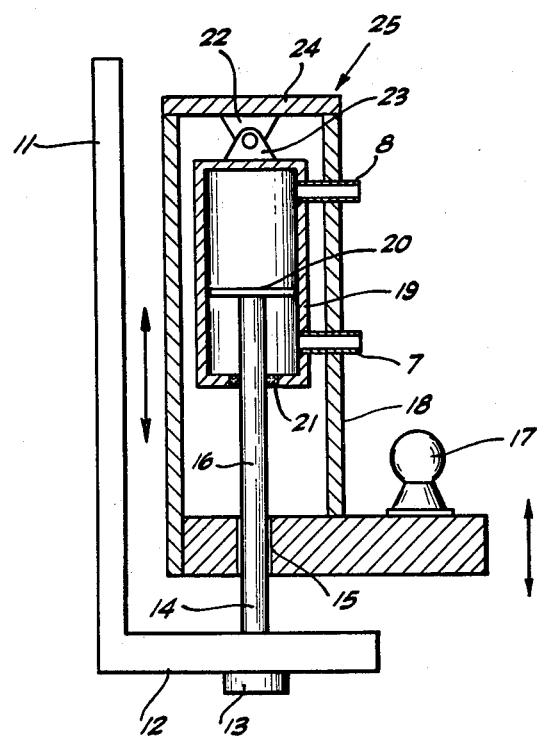
FIG. 2 shows a detail of the hydraulic lifting and lowering device.

There is provided a four-way valve 5 for regulation of hydraulic fluid flow to be described. Piping or steel flexible hosing 2, 4, 6, 9 and 10 is provided for transfer of the hydraulic fluid. Referring to FIG. 2, there is provided inlet and exit ports 7 and 8 for entry of the hydraulic fluid into the hydraulic cylinder 19 as shown.

There is provided a vertical steel plate 11 which is permanently affixed and made integral with the towing vehicle at the rear of such vehicle. Horizontal support plate 12 is made part of the vertical plate 11 and is also permanently affixed to the towing vehicle. Fastener or connector 13 is shown for fastening of piston rod 14 onto horizontal support plate 12 or, alternatively, piston rod 14 can be welded onto or into the horizontal support plate 12. In this fashion, the piston rod 14 is permanently affixed and made immovable with the towing vehicle. Accordingly, piston rod 14 and piston 12 do not move vertically in relation to the towing vehicle. Piston rod 14 is shown protruding within a steel casing 25. Such steel casing completely surrounds a hydraulic cylinder 19. The casing contais a horizontal support plate onto which is permanently affixed a standard hitching ball 17. The hydraulic cylinder 19 is permanently affixed to the casing 25 by support members 22 and 23 as shown. The piston rod interior 16 protrudes within the chamber of cylinder 19 which is equipped with standard packing 21. The piston 20 is placed on the upper portion of piston rod 16.

Accordingly, there is formed an upper chamber above piston 20 and a lower chamber below piston 20 within said hydraulic cylinder 19. Ports 7 and 8 are provided for entry and exit of the hydraulic fluid or oil into the upper and lower chambers of cylinder 19.

All of the materials for the foregoing are made of standard materials, preferably steel as is known in the art. The casing 25 can be but need not be a cylinder in form. It may be a block or any casing that encloses cylinder 19. In fact, the casing 25 may be open at some portions. As can be seen by the following description of the operation of the device, the casing serves to insure that the ball 17 is made integral with the cylinder 19, i.e. as cylinder 19 is lifted or lowered, so is lifted or lowered ball 17. Simple horizontal support plates such as shown connected to ball 17 with accompanying and affixed plates permanently affixed to the hydraulic cylinder can suffice. A preferred embodiment is a simple casing onto a horizontal support plate connected to the hitching ball. Accordingly, the term "casing" refers to any device that performs the function described herein. In the preferred embodiment, the casing completely encloses the hydraulic cylinder.

The casing 25 can be, but need not be, slidably mounted onto the vertical support plate 11 which is made integral with the towing vehicle. Plates can be mounted on the side of the casing for the sliding of the casing up and down the towing vehicle. Such a sliding mount makes for better stability of operation. Any device for stabilizing the vertical movement of the casing and ball joint can suffice.

To lift a mobile home, towed vehicle or other trailer, the ball hitch socket of such towed mobile home, trailer or vehicle is placed on the hitching ball 17 while hitching ball is in the lowered position. The hydraulic pump 3 is activated. Pump 3 can either be a standard power pump or hand-crank pump, preferably a hand-crank pump. Oil or hydraulic fluid flows from the reservoir 1 through flexible hosing 2 through pump 3, flexible hosing 4, the four-way valve 5 and flexible hose 9. The four-way valve is adjusted so that oil flows from the inlet hose 4 to the exit hose 9 and through port 8 and into the upper chamber of hydraulic cylinder 19. The pressure of the hydraulic fluid is exerted throughout all portions of the upper chamber of cylinder 19. Since the piston 20 is permanently affixed and does not move in relation to the towing vehicle, the hydraulic pressure forces the hydraulic cylinder to move upwards. The hydraulic cylinder is permanently affixed to the casing 25 which, in turn, is permanently affixed to ball 17. Accordingly, ball 17 moves upwardly.

The piston rod 16 being permanently affixed to horizontal support plate 12 and horizontal support plate 11 which are, in turn, permanently affixed to the towing vehicle, the piston 20 is essentially immovable and does not move with exertion of hydraulic pressure on such piston.

When it is desired to cease the lifting operation, the four-way valve is closed and hydraulic fluid pressure is stopped, thus stopping the lifting operation. At some point, it is desired that the ball 17 be lowered, as when the mobile home or the like is taken off the towing vehicle. At such time, the four-way valve is adjusted so that hydraulic oil flows through steel flexible hosing 6, through port 7 and into the lower chamber of cylinder 19. The hydraulic fluid exerts pressure throughout the lower chamber and onto the lower portion of piston 20. Since piston 20 is immovable, the hydraulic pressure forces the hydraulic cylinder downwards. Since the ball 17 is essentially integral with the cylinder 19, ball 17 is lowered. The lowering operation can be regulated by the four-way valve and adjustment of the hydraulic pressure.

The hydraulic reservoir, pump and four-way valve are standard in the industry as are the ball and other elements described herein.

The lines 6 and 9 are standard flexible hosing and, of course, move with the movement of the casing 25 and ball joint 17. The other lines can be and preferably are steel flexible hosing. The casing can be but need not be slidably mounted onto some permanent-type steel plate such as plate 11 and would thus be stabilized.

I claim:

1. A device for lifting and lowering a trailer or mobile home or the like on a towing vehicle comprising:
   (a) a hitching ball;
   (b) a first horizontal support plate permanently affixed to the towing vehicle and positioned below said hitching ball;
   (c) a vertically-disposed casing;
   (d) means for permanently affixing said ball to a second support plate integral with said casing;
   (e) a vertically-disposed hydraulic cylinder within said casing;
   (f) two (2) ports for entry and exit of hydraulic fluid to and from said cylinder and casing;
   (g) means for permanently affixing said cylinder to and within said casing;
   (h) a piston rod permanently affixed to said first horizontal support plate and protruding vertically into and within said casing and cylinder;
   (i) a piston affixed on the upper end of said rod and within said cylinder; and
   (j) means for injecting hydraulic fluid into the chamber of said cylinder above said piston for lifting of said hitching ball and into the chamber of said cylinder below said piston for lowering of said hitching ball.

2. The device of claim 1 wherein said casing is slidably positioned onto a vertical support plate which is permanently affixed to said towing vehicle and to said horizontal support plate.

3. The device of claim 1 wherein said means for injecting hydraulic fluid comprises a oil reservoir, a hydraulic hand pump, a four-way valve, and flexible hosing all acting in combination to provide hydraulic fluid to said chamber.

* * * * *